United States Patent [19]

Boggs

[11] Patent Number: 4,670,210
[45] Date of Patent: Jun. 2, 1987

[54] METHOD FOR REMOVING PROTRUDING REINFORCING FIBERS FROM A DEFLASHED FIBER REINFORCED PLASTIC ARTICLE

[75] Inventor: Beryl A. Boggs, Richmond, Va.

[73] Assignee: Allied Corporation, Morris Township, Morris County, N.J.

[21] Appl. No.: 771,962

[22] Filed: Sep. 3, 1985

[51] Int. Cl.$^4$ .............................................. B29C 47/06
[52] U.S. Cl. ..................................... 264/510; 264/80; 264/161; 264/500; 264/345; 425/806
[58] Field of Search ............... 264/80, 161, 344, 345, 264/500, 510; 28/239; 425/806

[56] References Cited

U.S. PATENT DOCUMENTS

| | | | |
|---|---|---|---|
| 3,022,564 | 2/1962 | Price | 28/239 |
| 3,543,619 | 12/1970 | Helhmer | 264/161 |
| 3,827,186 | 8/1974 | Ehnot | 51/7 |
| 3,909,988 | 10/1975 | Kerwin et al. | 51/153 |
| 4,312,156 | 1/1982 | McWhorter | 51/418 |
| 4,519,812 | 5/1985 | Brull et al. | 51/422 |
| 4,524,548 | 6/1985 | Klee et al. | 51/322 |
| 4,524,550 | 6/1985 | Burke et al. | 51/424 |

FOREIGN PATENT DOCUMENTS

| | | | |
|---|---|---|---|
| 24111 | 3/1981 | Japan. | |
| 1313660 | 4/1973 | United Kingdom | 28/239 |
| 0863388 | 9/1981 | U.S.S.R. | 264/80 |

Primary Examiner—Jan H. Silbaugh
Assistant Examiner—Harold Pyon

[57] ABSTRACT

Method for removing protruding reinforcing fibers from the flash area of a deflashed, fiber reinforced plastic article are provided. The method features melting the protruding fibers off of the article without damaging the article itself. The apparatus features an elongated chamber for receiving the articles, means for passing the articles in series through the chamber, means for heating air to a temperature of at least about 800° F. (427° C.), and means for directing the heated air across the articles one at a time while the articles are passing through the chamber.

5 Claims, 4 Drawing Figures

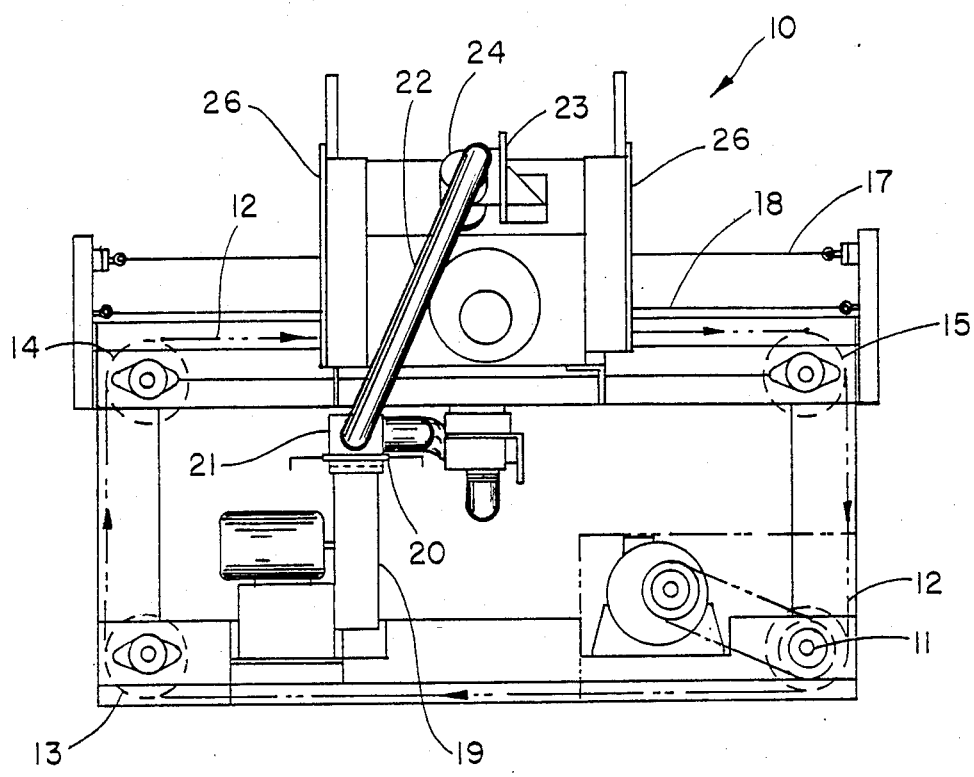
FIGURE 1
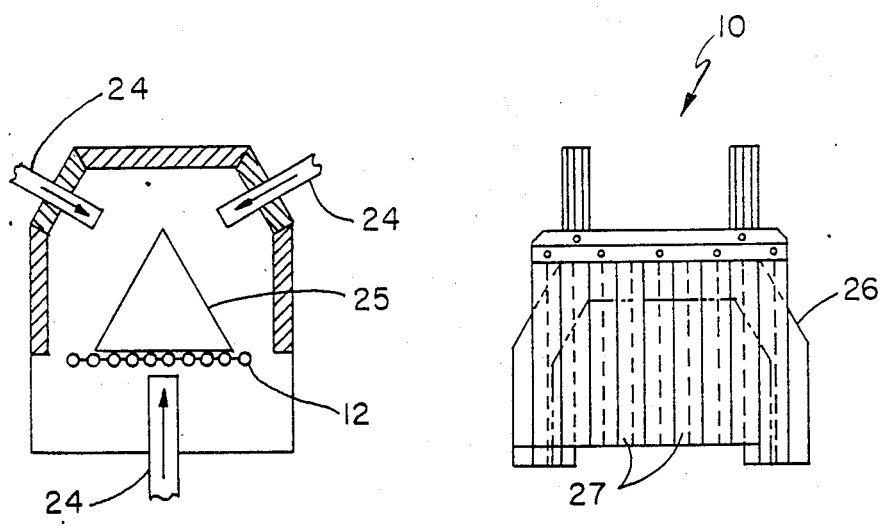
FIGURE 2
FIGURE 3

METHOD FOR REMOVING PROTRUDING REINFORCING FIBERS FROM A DEFLASHED FIBER REINFORCED PLASTIC ARTICLE

BACKGROUND OF THE INVENTION

1. Field of the Invention

This invention relates to a method of removing protruding reinforcing fibers from a deflashed, fiber reinforced plastic article. More particularly, this invention relates to method and apparatus for removing the fiber whiskers remaining in the flash area of a deflashed, molded plastic article, the fibers having been used in reinforcing the article.

2. The Prior Art

When articles are molded from thermosets, thermoplastics, rubber and the like, the initial product often has extra material called "flash" attached along the mold parting line. Flash results from that portion of the charge which flows from or is extruded from the mold cavity during molding, and is undesirable on most final products.

The removal of flash, or "deflashing", has been accomplished in many ways, e.g. manual deflashing with razor blades, rotation or shaking with abrasive media to break off the flash, and cryogenic deflashing. In the latter, flash is cryogenically embrittled followed by impact with deflashing media, such as pelletized steel or plastic shot, and/or tumbling. Various types of cryogenic deflashing apparatus are taught by U.S. Pat. Nos. 3,827,186 to Ehnot, 3,909,988 to Kerwin et al., 4,312,156 to McWhorter and 4,519,812 to Brull et al., all of which are hereby incorporated by reference.

Deflashing has been complicated by the inclusion of some types of reinforcing staple fibers in compounds to be molded. When polyester staple fibers are added, the flash itself can be removed, but the molded part is left with polyester fiber whiskers/tendrils protruding at the parting line in the original area of flash. This is not a problem with fiber glass reinforced plastic parts, since the fiber glass easily breaks away during deflashing.

The present invention was developed to overcome the problem of fiber whiskers remaining in the flash area of a plastic part deflashed according to prior art techniques.

SUMMARY OF THE INVENTION

The present invention provides a method for removing protruding reinforcing fibers from a deflashed, fiber reinforced plastic article.

The method comprises melting the protruding fiber off of the article without damaging the article. The preferred melting method is contact with a medium, preferably air, heated to a temperature of at least about 800° F. (427° C.), more preferably 1000°–1200° F. (538°–648° C.). The fibers are contacted with the air for a sufficient length of time to burn away without damaging the part; the preferred time of contact is one to two seconds.

Any type of fiber which cannot be cleanly removed during deflashing of the plastic article reinforced therewith is contemplated by this invention. Preferred reinforcing fibers are polyesters and polyamides. Hybrid blends are also included.

The preferred reinforcing polyesters are the linear terephthalate polyesters, i.e., polyesters of a glycol containing from 2 to 20 carbon atoms and a dicarboxylic acid component containing at least about 75 percent terephthalic acid. The remainder, if any, of the dicarboxylic acid component may be any suitable dicarboxylic acid such as sebacic acid, adipic acid, isophthalic acid, sulfonyl-4,4'-dibenzoic acid, 2,8-dibenzofurandicarboxylic acid, or 2,6-naphthalene dicarboxylic acid. The glycols may contain more than two carbon atoms in the chain, e.g., diethylene glycol, butylene glycol, decamethylene glycol, and bis(1,4-hydroxymethyl)cyclohexane. Examples of linear terephthalate polyesters which may be employed include poly(ethylene terephthalate), poly(ethylene terephthalate/5-chloroisophthalate)(85/15), poly(ethylene terephthalate/5-[sodium sulfo]-isophthalate)(97/3), poly(cyclohexane-1,4-dimethylene terephthalate), and poly(cylohexane-1,4-dimethylene terephthalate/hexahydroterephthalate)(75/25).

Suitable reinforcing polyamides include, for example, those prepared by condensation of hexamethylene diamine and adipic acid, condensation of hexamethylene diamine and sebacic acid known as nylon 6,6 and nylon 6,10, respectively, condensation of bis(para-aminocyclohexyl)methane and dodecanedioic acid, or by polymerization of 6-caprolactam, 7-aminoheptanoic acid, 8-caprolactam, 9-aminopelargonic acid, 11-aminoundecanoic acid, and 12-dodecalactam, known as nylon 6, nylon 7, nylon 8, nylon 9, nylon 11 and nylon 12, respectively. Other suitable reinforcing polyamides include the aramids, e.g. Kevlar ®.

In the most preferred method, protruding polyester reinforcing fibers are removed from the flash area of deflashed, fiber reinforced plastic articles. The articles are passed in series through an elongated chamber, and air having a temperature of at least about 800° F. (427° C.) is blown across the articles in the chamber one at a time to melt the fibers without damaging the articles.

The resin matrix utilized in forming the compound may include thermosetting or thermoplastic (including polyolefin) resins. Suitable thermosetting resins include polyester (preferably unsaturated), polyurethane, epoxy, or vinylester resin systems. Suitable thermoplastic resin systems include polyvinyl chloride, polyethylene, polypropylene, polystyrene, polyvinyl alcohol, polyamide, polyurethane, etc.

Injection, compression and resin transfer molding systems are exemplary of suitable molding systems.

The apparatus of the present invention comprises: an elongated chamber for receiving the articles; means for passing the articles in series through the chamber; means for heating air to a temperature of at least about 800° F. (427° C.), more preferably about 1000°–1200° F. (538°–648° C.); and means for directing the heated air across the articles one at a time while the articles are passing through the chamber. It is preferred that the heated air be directed across the articles by a plurality of nozzles arranged to discharge air at different angles across the articles. The number of nozzles preferably is three, and they are positioned at 120° intervals with respect to each article.

The addition of the heating stage of the present invention is critical to the successful use of some types of fibers as reinforcement for molded plastic parts. Heretofore parts reinforced with polyester staple fibers were aesthetically unacceptable, despite greatly increased impact resistance as compared with fiber glass reinforced parts.

Parts deflashed by hand as well as by automatic deflashing machines (e.g., wheel throwing or air jet impingement machines) are improved by the method and apparatus of this invention. And when an automatic deflashing machine is used, heat can be applied to the part/article at the final working station.

BRIEF DESCRIPTION OF THE DRAWINGS

FIG. 1 is a side view of heat chamber 10 and associated apparatus of the present invention;

FIG. 2 is a partial section of heat chamber 10 of FIG. 1 with a deflashed plastic part 25 therein;

FIG. 3 is an end view of heat chamber 10; and

DESCRIPTION OF THE PREFERRED EMBODIMENT

Figure 4:
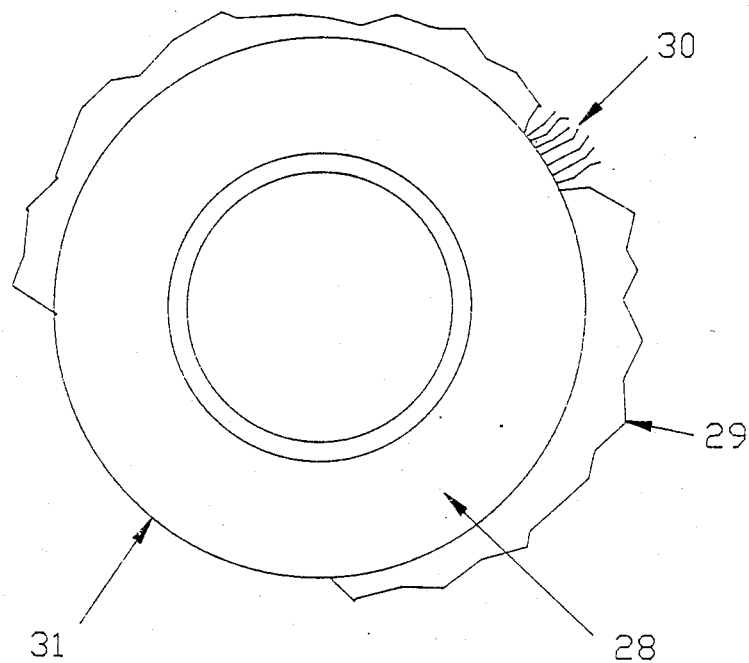
FIG. 4 depicts a partially deflashed inverted bowl 28.

In the accompanying drawings like numbers refer to like apparatus. With reference to FIG. 1, motor driven shaft 11 turns mesh belt 12 [Cambridge Cambri-link 1"×1"×12" (2.5 cm×2.5 cm×30 cm) ss] which drives sprockets 13, 14 and 15 about their respective idler shafts. Belt 12 is an endless conveyor belt on which molded plastic articles are placed for in series treatment in heat chamber 10. Air readily passes through the openings of mesh belt 12. Wires 17 and 18 provide a guide system horizontally and vertically for parts as they travel through heat chamber 10. The path of each part is thus restricted as it travels through heat chamber 10.

Air flow from blower 19 distributes through plenum 21 to three associated flexible tubes 22 designed for negative pressure. Damper 20 governs the amount of air flow from blower 19 outlet. Each flexible tube 22 is connected to an air heater 24 (Leister No. 884; 10,000 watts; 440 volts). Air heater 24 is an insulated metallic shroud with three resistance elements (unshown) therein over which the air from blower 19 is directed. The heating elements are plugged into a control box (unshown) and maintained at a fixed temperature. With reference to FIG. 2 it can be seen that one air heater 24 is placed beneath and directed for air discharge through mesh conveyor belt 12 onto molded plastic part 25. The other two air heaters 24 are mounted via adjustable brackets 23 for entry into heat chamber 10. These top two heaters 24 protrude into chamber 10 via apertures in the upper chamber 10 housing. Air heaters 24 (at the top) may be telescoped in and out for placement, after which they are bolted in place. Their position may be changed as often as desired in this manner. The chamber housing (sides and top) preferably is made of a suitable insulating material such as marinite XL, and is held together by a steel frame 26. Air heaters 24 are at 120 degree intervals with respect to one another about article 25.

In operation conveyor belt 12 is started, followed by cutting on blower 19 and then the heating elements in air heaters 24. Blower 19 is always on before air heaters 24 are on and is always off after air heaters 24 are off. Belt 12 can be on first or simultaneous with air heaters 24. Damper 20 aids adjustment of temperature; a pyrometer is inserted and the damper 20 is opened and closed until the desired reading is achieved on the pyrometer. Articles to be treated are placed on conveyor belt 12 for passage into heat chamber 10.

Heat chamber 10 is a restrictive cavity, but not airtight. On the entrance and exit ends (see FIG. 3) are three layers of thermoglass strips 27 [0.125 inch thick×2.0 inches wide (0.318 cm×5.1 cm)] with the outer and inner layers having nine strips each and the middle layer having eight strips; the middle layer of strips is offset with respect to the other layers of strips. Part 25 simply forces its way through these fabric strips 27 for entry into and exit from heat chamber 10. There is no criticality on sealing the heat chamber—heat chamber 10 does not have to be at the same temperature as the blasts of air coming against part 25. It is those blasts of air that must be at the specified temperature for long enough to burn away tendrils of fiber without damage to the plastic part. The heated medium may be other than air. A minimum of 800° F. (427° C.) is necessary to melt the whiskers without damage to the part; lower temperatures do not permit as smooth a finish. The maximum temperature is dependent on length of exposure. The length of exposure must, again, be insufficient to damage the part. Preferred temperatures are 1000° to 1200° F. (538° to 648° C.) for 1 to 2 seconds.

FIG. 4 depicts an inverted bowl 28 with flashings 29. Some of flashing 29 is depicted as having been broken away by a prior art technique—that area showing fiber tendrils 30 is illustrative. 31 illustrates the smooth edge obtained by melting away tendrils 30 with heat chamber 10 of the present invention.

The apparatus described is very useful as the last stage of an automatic deflashing machine. Nonetheless, a hand-held blower gun could readily be used to remove staple tendrils from deflashed articles also.

A microwave dish made of polyester resin calcium carbonate and reinforced with polyester fibers was dipped into a container of liquid nitrogen. The flash was embrittled. An attempt was made to dislodge the flash manually—however, the flash did not break away cleanly from the part. Apparently, the fiber did not stiffen sufficiently to break away, and the flash tended to cling to the fiber. It is believed that with longer exposure time the polyester fiber, too, would stiffen—but the time involved would be too long to make this method practical.

I claim:

1. A method of removing protruding reinforcing fibers selected from the group consisting of polyester and polyamide from a deflashed, fiber reinforced plastic article, comprising melting the protruding fiber off of the article without damaging the article by contact with air heated to a temperature of at least about 800° F. (427° C.) wherein said fibers are contacted with the air from 1 to 2 seconds.

2. The method of claim 1 wherein the air is at a temperature of about 1000° to 1200° F. (538° to 648° C.).

3. The method of claim 2 wherein said protruding fibers are polyester.

4. The method of claim 2 wherein said protruding fibers are polyamide.

5. A method of removing protruding polyester reinforcing fibers from the flash area of deflashed fiber reinforced molded plastic articles, comprising the steps of passing said articles in series through an elongated chamber and blowing air having a temperature of about 1000° to 1200° F. (538° to 648° C.) across said articles in said chamber one at a time to melt said fibers without damaging said articles.

* * * * *